Jan. 7, 1964     O. SCHWICKERT     3,117,045
METHOD OF PRODUCING ARTICLES FOR ADHESIVE
ATTACHMENT TO SURFACES
Filed Sept. 16, 1958

Inventor:
OTTO SCHWICKERT
BY
ATTORNEY

United States Patent Office 3,117,045
Patented Jan. 7, 1964

3,117,045
METHOD OF PRODUCING ARTICLES FOR
ADHESIVE ATTACHMENT TO SURFACES
Otto Schwickert, Idar-Oberstein, Germany, assignor to
Christian Melsheimer Nachf., Inh. O.E. & M. Schwickert, Idar-Oberstein, Germany, a German company
Filed Sept. 16, 1958, Ser. No. 761,393
5 Claims. (Cl. 156—278)

This invention relates to a method of producing metal articles of irregular form in its largest area, for attachment to surfaces by pasting. The articles, for example the letters of the alphabet, a medallion, an ornamentation, etc., may also have discontinuities in their largest area, the rear surface of which is to be adhered to a wall, plate, window, or the like by an adhesive.

It is well known that any article can be fastened to a surface by coating that rear face of the article by which it is to be attached with an adhesive, then pressing the article against the surface with such adhesive coated face against the surface, and while maintaining the pressure allowing the adhesive to set. When so attaching an article it is customary to apply the adhesive at the time and place of attachment, involving the expenditure of time-consuming and costly manual labor. An alternative method would be to apply to portions of the article to be so attached, adhesive carrier sheets gummed on both sides, which, while enabling attachment of the article to a surface, results in pointwise and regional adherence of the article with intermediate gaps between the attached face of the article and the surface to which the article is attached, into which dirt can penetrate. Also, with such mode of attachment, wilful removal of the attached article is facilitated. Completely covering the attaching surface of articles with an adhesive carrier sheet, gummed on both sides, has heretofore been considered futile since the gummed carrier could not be precisely cut to the contour of the attaching face of articles, particularly those of irregular shape, before being attached to such face of the article. Also, the accurate fitting and attaching of a cut-out carrier is most cumbersome, difficult, and, in practice, impossible. To first attach an adhesive carrier, gummed on both sides, to the attaching face of the article, results in it being impossible accurately to cut the sheet to conform to the article, as is cutting the sheet after the article is attached to the attaching surface.

Where an article per se is produced by blanking, stamping, or punching from a sheet or plate, the sheet or plate might be coated on one surface with an adhesive, or have an adhesive carrier coated on both sides applied to one surface, before the article is cut from the sheet or plate. Where, however, such stamped article requires processing after it is blanked out, for example treatment in a bath to electrolytically oxidize the surface thereof, or to chrome, gold or silver plate, etc., the article, such application of the adhesive or adhesive carrier is not practical since either the processing bath would have its effectiveness impaired or destroyed by the adhesive, or the adhesive properties of the adhesive material would be impaired or destroyed by the bath. And with articles produced by casting, or application of high pressures or temperatures, as in extrusion products, prior application of an adhesive or an adhesive carrier is totally impossible. In such instances, the adhesive material would be destroyed or so impaired that intimate contact and adhesion between the article and the surface to which it is to be attached is impossible.

An object of my invention is so to provide the rear surface of metal articles, to be attached to a surface by adhesives, with an adhesive carrier gummed on both sides and accurately contoured to correspond to the shape of such rear surface, the carrier having an active, sticky adhesive on the side thereof toward the attaching face of the article.

A further object of my invention is to provide a method by which an adhesive carrier, with an active sticky adhesive on at least the carrier face toward the attaching surface of the article and an adhesive on its other face, which carrier is accurately contoured to the article and in which the portions of the sticky adhesive on such carrier face not engaged by the attaching surface of the article are rendered inactive.

Still a further object of the invention is to provide a method by which an adhesive carrier is gummed on both sides with adhesives of which at least the adhesive on the side of the carrier toward the attaching face of the article is an active adhesive or one readily rendered active, and the adhesive on the opposite face of the carrier is one rendered active at the time of attaching the article to a surface, with the portions of the adhesive on the first-mentioned carrier side not engaging the attaching surface of the article after the carrier is applied to the article being first rendered inactive and such carrier portions thereafter being removed.

All the disadvantages of the prior methods are eliminated by the use of my method which can be applied to articles, no matter how made, which are adapted for pasting to a supporting surface. After the article per se is given its shape and fully manufactured by any methods whatsoever, there is adhered to the attaching surface of the article a carrier which is coated with adhesive on both sides. The adhesives applied to the respective sides of the carrier may differ in their type, the one applied to the face toward the article being either sticky at ordinary temperatures, or readily rendered sticky by either pressure or temperature increases, while the adhesive on the opposite carrier face is of the type which may be rendered sticky by increasing either the pressure or temperature thereof. After the sticky side of the carrier, which is not yet shaped to the contour or the attaching surface of the article, is attached to the article, those portions of the sticky adhesive not covered by the attaching surface of the article are rendered inactive by dusting with talcum, and the carrier sheet blanked, stamped or punched out to conform exactly to the shape, including apertures, of the article along the attaching surface. The article with the carrier, exactly conforming to the attaching surface, attached thereto is thus available at the installation site, where the outer face of carrier is rendered active and the article with the attached carrier pressed against the surface to which attachment is to be made with the outer carrier face against the latter surface. Not only may this be of use with all articles which are adaptable to fastening to another surface by the intermediary of an adhesive, such as mucilage, glue, pastes, etc., but the article per se may be of any metal.

Similarly useful in the practice of the instant invention is coating the surface of the carrier by which it is to be attached to the article with a dry adhesive which may be activated by a solvent, such as water, or by the application of heat. The completed article per se is pressed against the dry adhesive after the latter has been rendered sticky by the addition of the solvent, or by heating, as the case may be, and the adhesive permitted to set thus to attach the article to the carrier. When the adhesive is again dry, that is hardened, the sheet carrier is punched out, for which purpose the same tool or machine may be used as was used for making the article.

Whether a sticky adhesive, or a dry adhesive rendered active by a solvent or by heat, is used, it will be noted that those portions of the carrier of which the adhesive coating facing the article is not covered by the article, are rendered inactive, and then are accurately removed as by punching. Thus, the surface to which the article is attached will show through the attached article at all openings therein, rather than the relatively unsightly carrier with its hardened adhesive thereon.

In a modification of the method of my invention, the face of the carrier away from the surface by which the carrier is attached to the article may be coated with an adhesive which is sticky and activated. In such instance, I provide a cover sheet over such sticky adhesive coating so that this sticky coating cannot and does not interfere with the stamping out of the carrier at the factory to exact conformity with the article. The cover sheet is readily removable at the site and at the time when the article is to be installed.

The method and product of the invention will more readily be understood from the explanation now given of illustrative embodiments thereof, when read in conjunction with the appended drawing, in which.

Figure 1:
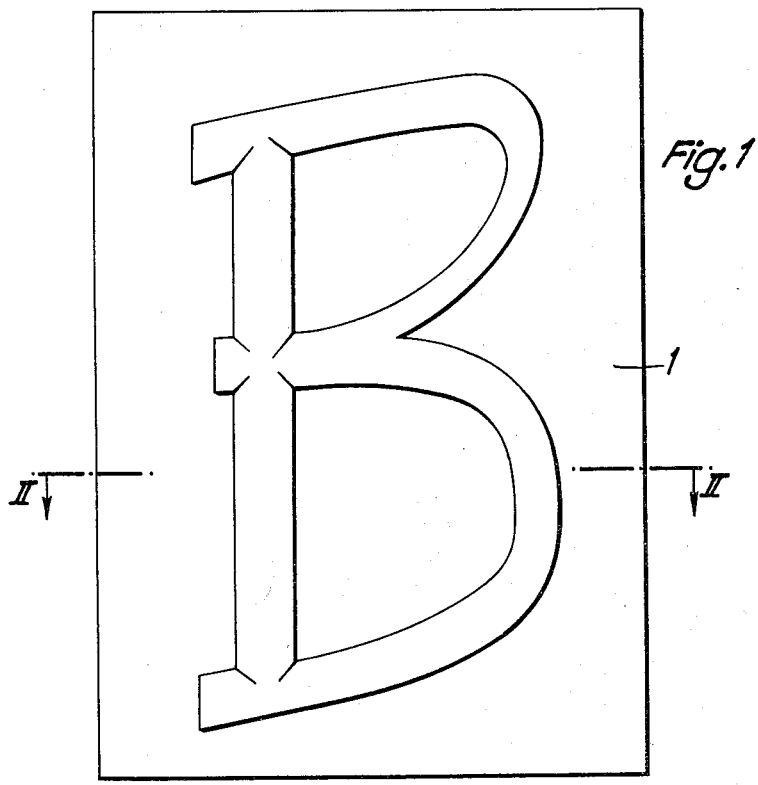
FIG. 1 is an elevational view of a stamped metal letter B attached to a surface, the letter assembly having been by the method of the invention.
Figure 2:
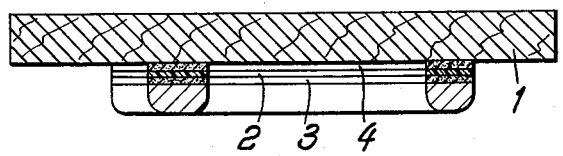
FIG. 2 is a section on line II—II of FIG. 1.

The letter B, shown in FIG. 1 as attached to a plate glass or mirror 1, is produced by the method of my invention by first stamping the letter from a sheet of aluminum and then anodically treating it to oxidize its surface. Thereafter a sheet 2 of carrier stock, for example in the form of a continuous wide band, is coated with an adhesive 3 on the face to which the letter B is to be attached, as also an adhesive 4 on its opposite face. The adhesive 3 may be of the type that is sticky at the normal range of temperature or may be of the dry type which on treatment with a solvent becomes sticky, or of the heat activated type that becomes sticky and active at increased temperature. The carrier may be a synthetic, a plastic, a paper, or a webbing of any kind. In the section of FIG. 2, the adhesive 3 is of the sticky, dry, or heat-activated type. If the layer 3 is not already sticky and active, it is treated with its solvent or heated as the case may be, and the article, in this case the letter B, pressed thereagainst to adhere to the carrier. The portions of layer 3 not covered by regions of the article are now rendered inactive be it by dusting the still exposed portions of layer 3 with talcum to cover them, or by removal of the solvent, as by drying, or by cooling in the case of the heat-activated type. Thereupon the carrier is severed from its supply and the severed carrier stamped out in exact conformity to the letter B adhering to it. Thus, the article is now backed by an exactly shaped carrier 2 with the adhesive layer 4 exposed and ready to be installed whenever and wherever required. Merely by moistening the layer 4 with the appropriate solvent, or by heating the layer, depending on whether the layer is of the dry or heat-activated type, and pressing the article against the surface 1, the letter B will be attached thereto.

Figure 3:
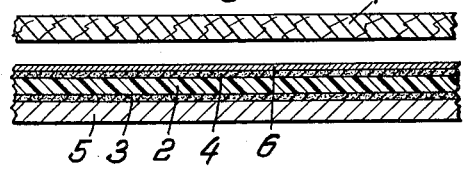
FIG. 3 is like FIG. 2 differing in that a protective sheet for an adhesive coating is provided.

In the alternative method, of which a section through the body as obtained thereby and through the attaching surface, is shown in FIG. 3 prior to the attachment of the body to the surface, like reference characters denote the same elements as in the embodiment of FIGS. 1 and 2. The article 5 is attached to carrier 2 by an adhesive layer 3, the carrier being of any of the above stated materials and the layer of any of the three stated types. The adhesive layer 4 is, however, of an adhesive of the sticky type only, and is protected by a cover sheet 6 of plastic, paper, or fabric, which is not removed until just immediately prior to affixing the body 5 by carrier 2 to surface 1. In every respect the steps of the method remain the same, and obviously in this instance the protective sheet is preferably stamped out simultaneously with the stamping out of carrier 2 to conform to the article. Both layers 3 and 4 of adhesive may be of the weatherproof type if so required in view of the site where the bodies are to be used.

As examples of the various types of adhesive above mentioned: a type active and sticky at normal temperature ranges if not permitted to dry out is caoutchouc adhesive; while a dry type is exemplified by polyvinylchloride adhesive for which the solvent is any organic solvent; and a heat activated type is polyvinylacetate adhesive which becomes sticky at 60–100° C. Particularly good weatherproof adhesives are polyacrylic compounds.

What I claim is:

1. The method of manufacturing an article for adhesive attachment over the entire area of one of its surfaces to other surfaces comprising stamping a metal component of the article from a metal sheet,
   treating the surface of the metal component of the article to provide a finish,
   adhering to said one surface of the metal component of the article a larger continuous carrier sheet coated on both its surfaces with an activatable adhesive whose effectiveness would be impaired by the treating step,
   all of said adhesive on the face of the carrier to which the metal component of the article is adhered being preactivated prior to the adhering step,
   rendering inactive all portions of the activated adhesive remaining uncovered by the adhered article,
   and then stamping out all inactivated and uncovered portions of the carrier.

2. The method according to claim 1 in which at least the adhesive on the exposed surface of the carrier sheet is a dry adhesive and is renderable active by the application of pressure.

3. The method according to claim 1 in which at least the adhesive attachable to the surface of the metal component of the article is a dry adhesive and is renderable active by the application of heat,
   heating the metal component of the article sufficiently prior to engaging with the adhesive to render the adhesive sticky on application thereto of the heated component.

4. The method according to claim 1 in which the adhesive is rendered sticky by the application of a solvent,
   applying a solvent to the adhesive prior to adhering the carrier sheet to the metal component of the article,
   and then drying the adhesive prior to the stamping step.

5. The method according to claim 1 in which the activated adhesive portions remaining uncovered by the adhered article are rendered inactive by dusting them with talcum powder.

References Cited in the file of this patent

UNITED STATES PATENTS

| | | |
|---|---|---|
| 1,259,787 | Segall | Mar. 19, 1918 |
| 2,096,389 | Bode | Oct. 19, 1937 |
| 2,453,441 | La Fair | Nov. 9, 1948 |
| 2,596,179 | Seymour | May 13, 1952 |